(12) United States Patent
Helberg et al.

(10) Patent No.: US 10,395,340 B2
(45) Date of Patent: Aug. 27, 2019

(54) SYSTEM AND METHOD OF GENERATING 3D INFRARED CAMERA STITCHING FOR A THERMAL MAPPING

(71) Applicant: Dell Products, LP, Round Rock, TX (US)

(72) Inventors: Christopher M. Helberg, Austin, TX (US); Deeder M. Aurongzeb, Austin, TX (US); Travis C. North, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 165 days.

(21) Appl. No.: 15/067,067

(22) Filed: Mar. 10, 2016

(65) Prior Publication Data

US 2017/0264882 A1    Sep. 14, 2017

(51) Int. Cl.
| | |
|---|---|
| *H04N 13/00* | (2018.01) |
| *G06T 3/40* | (2006.01) |
| *G06T 7/00* | (2017.01) |
| *H04N 5/33* | (2006.01) |
| *G01B 11/22* | (2006.01) |
| *G08B 17/12* | (2006.01) |
| *H04N 5/247* | (2006.01) |
| *H04N 5/262* | (2006.01) |

(52) U.S. Cl.
CPC ............ *G06T 3/4038* (2013.01); *G01B 11/22* (2013.01); *G08B 17/12* (2013.01); *H04N 5/247* (2013.01); *H04N 5/2624* (2013.01); *H04N 5/33* (2013.01)

(58) Field of Classification Search
None
See application file for complete search history.

(56) References Cited

U.S. PATENT DOCUMENTS

| | | | | |
|---|---|---|---|---|
| 2006/0280034 | A1* | 12/2006 | Howard | H04B 13/02 367/134 |
| 2008/0211915 | A1* | 9/2008 | McCubbrey | G08B 13/19608 348/159 |
| 2011/0143779 | A1* | 6/2011 | Rowe | G06Q 30/02 455/456.3 |

(Continued)

*Primary Examiner* — Edemio Navas, Jr.
(74) *Attorney, Agent, or Firm* — Prol Intellectual Property Law, PLLC; H. Kenneth Prol

(57) ABSTRACT

An information handling system comprising a storage device for receiving a first infrared image and a second infrared image of a temperature observation area captured from a first infrared camera, each infrared image having a segmented field of view, wherein the segmented field of view of the first infrared image overlaps at least in part the segmented field of view of the second infrared image and wherein the network adapter receives temperature recording data from a first remote point source temperature probe located within at least one of the segmented fields of view and processor is operatively coupled to the memory and network adapter and executes code instructions of an image-stitching module for calibrating the first infrared image based on temperature values from the temperature recording data received from the first remote point source temperature probe and stitches the first infrared image together with the second infrared image to create a first combined infrared image by detecting one or more shared isotherms in each of the infrared image and the second infrared image.

20 Claims, 10 Drawing Sheets

(56) References Cited

U.S. PATENT DOCUMENTS

| | | | |
|---|---|---|---|
| 2012/0033030 A1* | 2/2012 | Liu | H04N 7/15 348/14.08 |
| 2012/0243300 A1* | 9/2012 | Helder | G11C 7/1057 365/154 |
| 2013/0197855 A1* | 8/2013 | Oskam | G01M 15/14 702/135 |
| 2017/0054923 A1* | 2/2017 | Thompson | H04N 5/33 |

* cited by examiner

SYSTEM AND METHOD OF GENERATING 3D INFRARED CAMERA STITCHING FOR A THERMAL MAPPING

FIELD OF THE DISCLOSURE

The present disclosure generally relates to information handling systems, and more particularly generating a temperature map indicating aggregate readings of temperatures across given fields of view of a plurality of infrared cameras.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

As information handling technology has transitioned beyond the legacy computer and hand held devices and toward the Internet of Things (IoT), in which many devices at varying physical locations operate as part of an aggregate system, a need for new strategies regarding maintenance analytics and optimizing performance of each of the devices in any given system, and the system as a whole, has developed. Previous strategies focused upon gathering analytical performance data of only a single device in a given physical location, and did not address the interaction between the performances of interacting devices. New strategies are needed that provide this depth of information in order to take a holistic approach to information compilation and handling. In particular, a strategy is needed for thermally mapping a facility and for providing accurate information to the user of the thermal environment.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
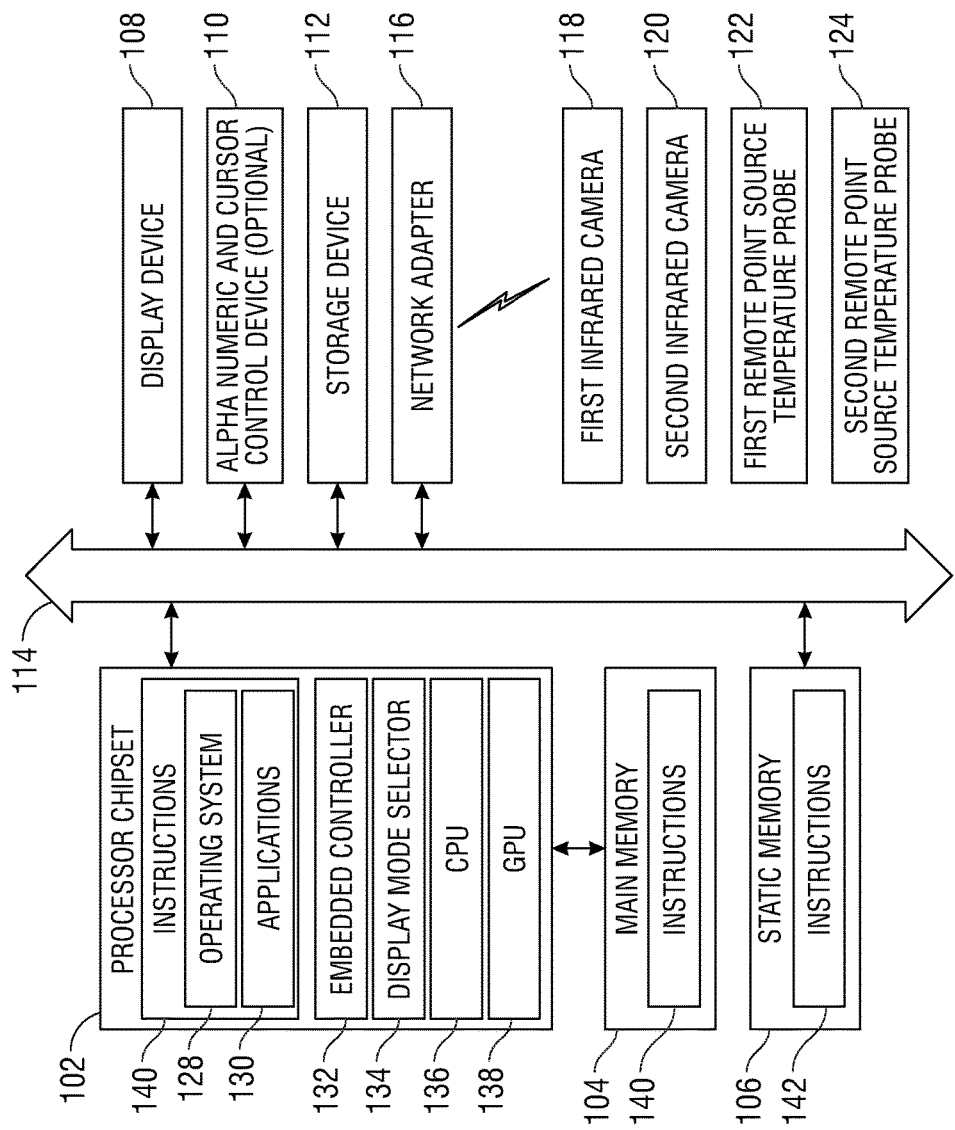
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code 140, such as a central processing unit (CPU), a programmable logic array (PLA), an embedded device such as a System-on-a-Chip (SoC), or other control logic hardware. Information handling system 100 can also include one or more computer-readable media 104, 106 for storing machine-executable code 140, such as software or data. Machine executable code may include instructions such as those executing an operating system 128 or other software applications 130. Example software applications may include an image-stitching module and a warning module as described in embodiments herein. In other aspects, machine executable code instructions may be embodied in firmware or in a hardware format such as application-specific integrated circuits (ASICs) to perform as an image-stitching module or a warning module for example.

Information handling system 100 can include devices or modules that embody one or more of the devices or modules described above, and operates to perform one or more of the methods described above. The information handling system 100 shown in FIG. 1 may operate as a standalone device or may be connected such as using a network, to other computer systems or peripheral devices operating various software, firmware or the like to executed embodiments of the present disclosure. Further, while a single information handling system 100 is illustrated, the term "system" shall also be taken to include any collection of systems or sub-systems that individually or jointly execute a set, or multiple sets, of instructions to perform one or more computer functions according to the present disclosure.

Information handling system 100 includes a processor chipset 102, a main memory 104, a static memory 106, a user interface 108, an optional alpha numeric and cursor control device 110, storage device 112, a network adapter 116. Additional components that may be connected via network adapter 116 or via one or more busses 114 in some embodiments may include a first infrared camera 118, a second infrared camera 120, a first remote point source temperature probe 122 and a second remote point source temperature probe in some example embodiments.

Processor chipset 102 is connected to Main Memory 104. In a particular embodiment, information handling system 100 includes separate memories that are dedicated to processor chipset 102 via separate memory interfaces. An example of Main Memory 104 includes random access memory (RAM) such as static RAM (SRAM), dynamic RAM (DRAM), non-volatile RAM (NV-RAM), or the like, read only memory (ROM), another type of memory, or a combination thereof. An example of bus includes a Peripheral Component Interconnect (PCI) interface, a PCI-Extended (PCI-X) interface, a high-speed PCI-Express (PCIe) interface, another industry standard or proprietary communication interface, or a combination thereof.

The information handling system 100 may also include one or more buses 114 operable to transmit communications between the various hardware components. Processor chipset 102 can also communicate via one or more other I/O interfaces of buses 114, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. Additional components of information handling system 100 connected via a bus 114 can include one or more storage devices 112 that can store machine-executable code 140, one or more communications ports on bus 114 for communicating with external devices, and various input and output (I/O) devices, such as an alphanumeric cursor control device 110 such as a keyboard, a mouse, and a video display 108. As shown, the information handling system 100 may include a video display unit 108, such as a liquid crystal display (LCD), an organic light emitting diode (OLED), a flat panel display, a solid state display, or a cathode ray tube (CRT). In another example, the information handling system 100 can include a main memory 104 and a static memory 106 or other storage device 116 that can communicate with each other via a bus 114. Network adapter 116 may be connected via bus 114 as well. Network adapter 116 may be wired or wireless. The network adapter 116 may be a wireless adapter that can provide connectivity to a network, e.g., a wide area network (WAN), a local area network (LAN), wireless local area network (WLAN), a wireless personal area network (WPAN), a wireless wide area network (WWAN), or other network. Network connectivity may further permit connectivity to remotely connected information handling systems or databases and provide for virtualized architectures to be implemented in some embodiments. Network connectivity may also provide wireless or wired connectivity to the internet or one or more intranet systems to execute various embodiments of the present disclosure.

First infrared camera 118, second infrared camera 120, first remote point source temperature probe 122, and second remote point source temperature probe 124 are connected to processor chipset 102 via network adapter 116. In some embodiments, these components may be connected to processor chipset 102 directly via bus 114.

System 100 of the current embodiment may communicate with a first infrared camera 118, and a second infrared camera 120 to capture images for storage at the information handling system 100. In an embodiment, the CPU 138, or other processor of the information handling system 100, may communicate with the first infrared camera 118, and the second infrared camera 120 to receive the captured images, to calibrate the images, and to calculate the temperature at various points within the images in accordance with the disclosure herein. The images and associated metadata may be stored in a memory of the information handling system 100, such as the static memory 106, the main memory 104, or the like. While the system 100, as depicted in FIG. 1 only shows a first infrared camera 118, and a second infrared camera 120, the system 100 may include one or more infrared cameras. The infrared cameras may be connected to bus 114 or via network adapter 116 such as wirelessly by radio frequency communication, including Wi-Fi and Bluetooth connectivity.

System 100 of the current embodiment may communicate with a first remote point source temperature probe 122 and a second remote point source temperature probe 124 to record temperature and background radiation at a specific location. A temperature probe may include a thermocouple or other suitable temperature sensor and a controller or other processor control logic for determining temperature at a location of the temperature sensor. In an example embodiment, the remote point source temperature probe may have a network adapter for interfacing wirelessly or by wire with system 100. In an embodiment, the CPU 136, or other processor of the information handling system 100, receives the temperature and background radiation readings at a specific location from the first remote point source temperature probe 122 or the second remote point source temperature probe 124 to calibrate the infrared images captured by the first infrared camera 118 and the second infrared camera 120 using this temperature and background radiation data. The system may communicate with the first remote point source temperature probe 122 and second remote point source temperature probe 124 via network adapter 116 such as wirelessly by radio frequency communication, including Wi-Fi and Bluetooth. In some embodiments, one or more point source temperature probes may be connected via I/O ports and bus 114. The temperature and background radiation readings and associated metadata may be stored in a memory of the information handling system 100, such as static memory 106, the main memory 104, or the like. While FIG. 1 shows a first remote point source temperature probe 122 and a second remote point source temperature probe 124, the system 100 may be networked or connected with one or more remote point source temperature probes in any number.

Aspects of the disclosed embodiments are described below with reference to flow diagrams and/or block diagrams of methods, apparatus (systems) and computer program products. It will be understood that each block of the flow diagrams and/or block diagrams, and combinations of blocks in the flow diagrams and/or block diagrams, can be implemented by computer program instructions 140. The computer program instructions 140 may be provided to the processor chipset 102 of a general purpose computer, special purpose computer, or other programmable data processing apparatus to produce a machine, such that the instructions 140, which execute via the processor chipset 102 of the computer or other programmable data processing apparatus, create means for implementing the functions/acts specified in the flow diagrams and/or block diagram block or blocks.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include flash devices, a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware or in some instances software of firmware. For example, a portion of an information handling system device may be hardware such as, for example, an integrated circuit (such as an ASIC, a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware operating on a device, such as an Intel® Core, Atom and other class, IBM® Power Architecture, ARM® 64 bit or 32 bit RISC architecture processor, or other such device, microcontroller, firmware or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Figure 2:
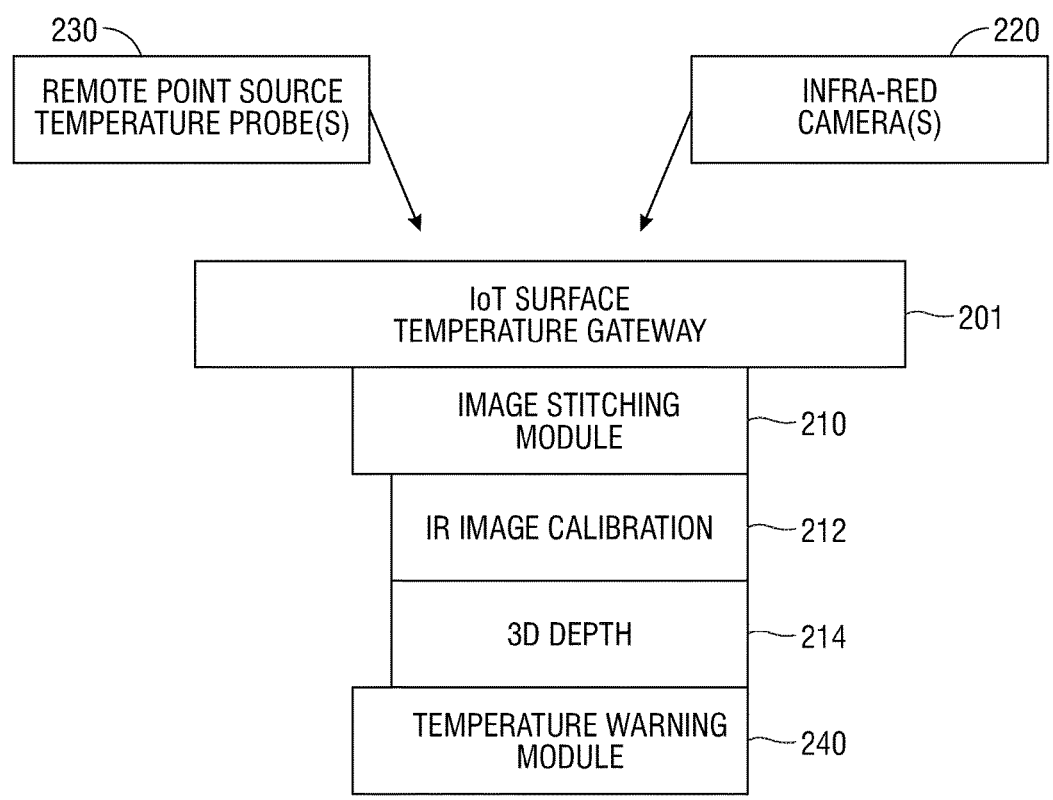
FIG. 2 shows a flow diagram illustrating a method generating combined infrared images comprising the full field of view for an infrared camera according to an embodiment of the present disclosure.

FIG. 2 shows a block diagram of an infrared image stitching code module 210 executable on an information handling system serving as an IoT gateway 201 for stitching infrared images of surface temperatures in an example embodiment. In one aspect, the IoT gateway 201 may comprise or communicate with a plurality of infrared cameras providing numerous views of an area or room to detect surface temperatures in the area or room. Such an IoT gateway 201 for stitching infrared images may be used in a context of a server room operating a plurality of server systems to detect potential overheating when airflow or other issues may arise in an example embodiment. In one embodiment, the information handling system operating as IoT gateway 201 may be connected via a network adapter to one or more infrared cameras 220. In another embodiment, infrared camera or cameras 220 may be connected via an I/O bus. A plurality of infrared images may be received from infrared camera(s) 220 at IoT surface temperature gateway device 201.

In an example embodiment, an IoT gateway 201 may receive infrared images from multiple infrared cameras 201 mounted on multiple sides of the IoT gateway 201 to provide fields of view from all sides of the IoT gateway 201. In further example embodiment, six cameras may be mounted on an IoT gateway 201 to provide fields of view for six sides of a cube or rectangular box for the IoT gateway 201. In yet other embodiments, multiple infrared cameras 201 may be mounted on separately from the box or case of IoT gateway 201. It is appreciated that a combination of infrared camera locations both mounted on IoT gateway 201 and remotely mounted is contemplated to cover a surface temperature observation area such as a room in some embodiments.

In another aspect, one or more remote point source temperature probes 230 may be mounted within a surface temperature observation area. The remote point source temperature probes 230 may be networked with IoT gateway 201 via network adapter or may, in some embodiments, be connected via a bus and a remote device port such as a USB or similar connection. The remote point source temperature probes 230 may provide a thermocouple or other temperature sensor for reference to the infrared camera or cameras 220 to calibrate emissivity measurements with measured thermal levels. The remote point source temperature probes 230 may also serve as a remote point source location for distance estimation and calibration for three-dimensional determination of infrared images or combined infrared images stitched according to the present disclosure. In an aspect, remote point source locations may also be used independent of a temperature probe location for distance calibration and determination for infrared images.

As discussed further below, executable code instructions may operate on IoT gateway 201 to provide thermal mapping and detection across surface areas of a temperature observation area. Executable code instructions may implement an image stitching module 210 according to the present disclosure. The image stitching module 210 may conduct infrared image stitching along shared isotherms as described in embodiments herein. Image stitching module 210 may also conduct infrared image calibration 212 based on thermal probe measurements from remote point source temperature probes 230 in some embodiments. In another embodiment, image stitching module 210 may also three-dimensional infrared image determination 214 based on pixel shift or other methods for pixels within combined infrared images according to embodiments herein.

As discussed further below, executable code instructions may also operate on IoT gateway 201 to provide thermal detection and warning across surface areas of a temperature observation area. In an example embodiment, a temperature warning module 240 operating at an information handling system serving as an IoT gateway 201 or at a remote location may determine if any surface area temperature measurements via the one or more infrared cameras 220 according to the present embodiments exceed a threshold level. If a threshold is exceeded, the temperature warning module 240 may generate a warning indicator in an example embodiment. The warning indicator may include metadata such as time of the detected threshold temperature level in some embodiments. In additional embodiments, a location of the detected temperature threshold may be provided. This may include an infrared image showing temperature threshold locations in an embodiment. In other embodiments, the warning indicator may include an overlay of visual images of the surface temperature observation area. In other embodiments, a visual image of the surface temperature observation area may be viewed from the infrared images themselves. In yet another aspect of the present disclosure, a depth measurement may be provided for the infrared temperature measurements of the surface temperature observation area to provide additional detail on location of hot spots detected by the temperature warning module. Multiple executable code modules for methods described herein may be coordinated via an API as is understood by those of skill in the art. In other embodiments, one or more aspects of the image stitching module 210 or the temperature warning module 212, including infrared image calibration 212 or three-dimensional depth calibrations aspects may be conducted at a remote location on a separate information handling system from the IoT surface temperature gateway device. In other embodiments however, the IoT gateway device 201 of the present disclosure may provide a stitched combined infrared image from multiple infrared cameras reporting a plurality of infrared images to the IoT gateway device. The image stitching module and the temperature warning module may work to provide a summarized view of surface temperature observation area useful for monitoring a thermal environment.

Figure 3:
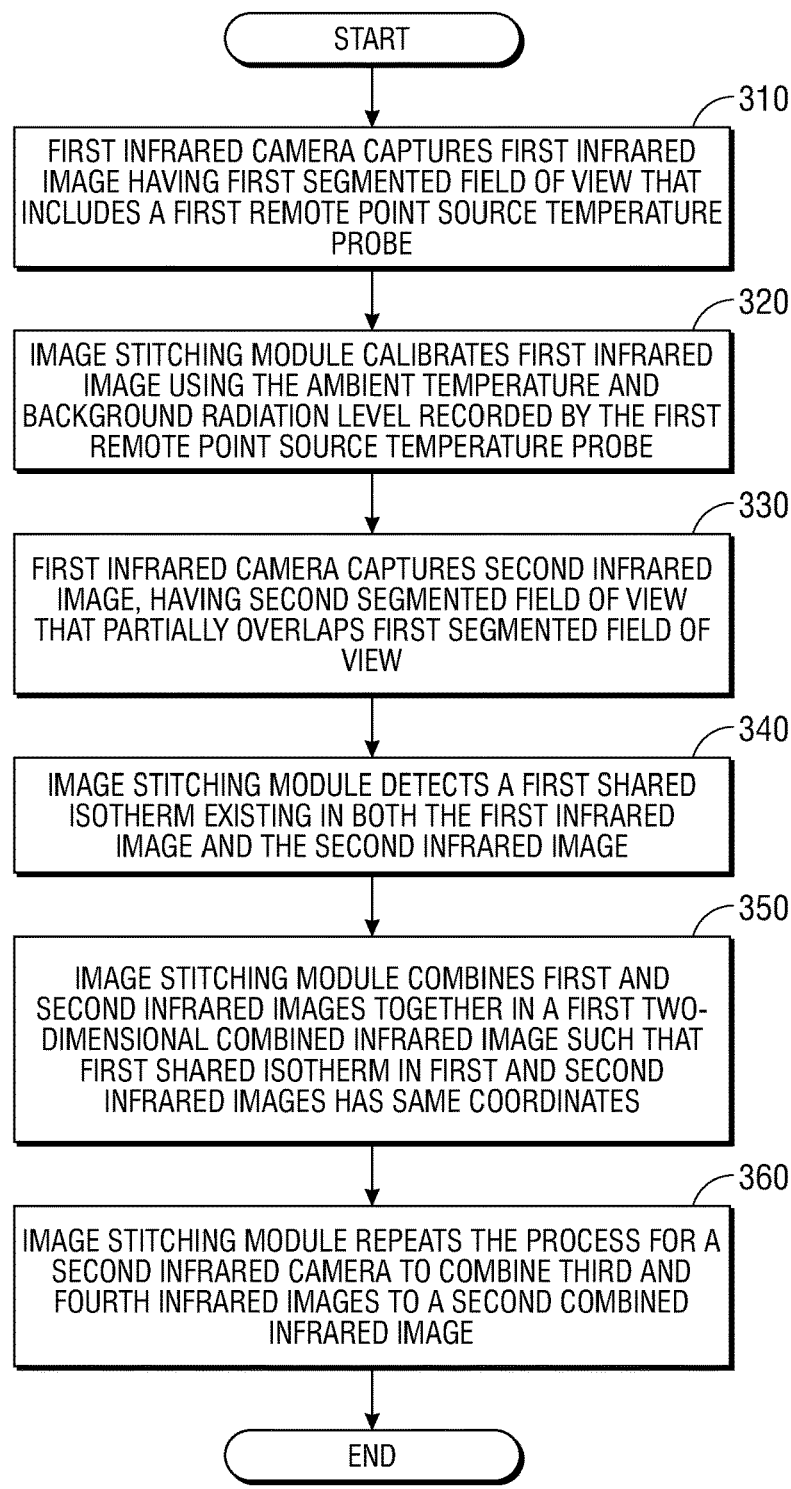
FIG. 3 is a block diagram illustrating a first infrared camera having a segmented field of view and combining fields of view according to an embodiment of the present disclosure.

FIG. 3 shows a flow diagram illustrating a method in an embodiment of generating a two-dimensional combined infrared image comprising the full field of view for an infrared camera. At block 310, in an embodiment, an infrared camera may capture a first infrared image having a first segmented field of view that includes a first remote point source temperature probe. A first infrared image with a first segmented field of view, and including a first remote point source temperature probe, is described in greater detail below with reference to FIG. 4.

At block 320, in an embodiment, an image-stitching module may calibrate the first infrared image using the temperature or the background radiation recorded by the first remote point source temperature probe to adjust emissivity determinations as described below. At block 330, in an embodiment, the first infrared camera may capture a second infrared image, having a second segmented field of view that partially overlaps the first segmented field of view. The combined first and second segmented fields of view comprise the full field of view of the first infrared camera, as described below in greater detail with reference to FIGS. 4 and 5. At block 340, in an embodiment the image-stitching module may detect a shared isotherm existing in both the first infrared image and the second infrared image, as discussed in greater detail below with reference to FIG. 5. At block 350, in an embodiment, the image stitching module may combine the first and second infrared images together in a two-dimensional combined infrared image such that the shared isotherm in the first and second infrared images has the same coordinates in the two-dimensional combined infrared image as a reference between the first and second segmented fields of view, as discussed in greater detail below with reference to FIG. 5.

At block 360, the image stitching module may determine another combined infrared image for a second infrared camera. The second infrared camera may capture a third infrared image having a third segmented field of view that includes a second remote point source temperature probe, as discussed below in greater detail with reference to FIG. 6. The image-stitching module may calibrate the third infrared image using the temperature and background radiation level recorded by the second remote point source temperature probe as discussed further. The second infrared camera may also capture a fourth infrared image, having a fourth segmented field of view that partially overlaps the third segmented field of view, wherein the combined third and fourth segmented fields of view may constitute the full field of view of the second infrared camera. An example embodiment of the first, second, third and fourth fields of view of the first and second infrared cameras are shown greater detail below with reference to FIG. 6. In an embodiment, an image-stitching module may detect a second shared isotherm existing in both the third infrared image and the fourth infrared image, as described below in greater detail with reference to FIG. 7. Accordingly, the image-stitching module may combine the third and fourth infrared images together into a second two-dimensional combined infrared image such that the second shared isotherm in the third and fourth infrared images has the same coordinates in the second two-dimensional combined infrared image. At this point the process may end. It is understood however, that a thermal mapping system may use multiple infrared cameras along a surface of a system or separately disposed throughout an imaged area to thermally map a space or area. In one example embodiment, several infrared cameras may be mounted on a surface of a information handling system to thermally map a space surrounding the information handling system.

Figure 4:
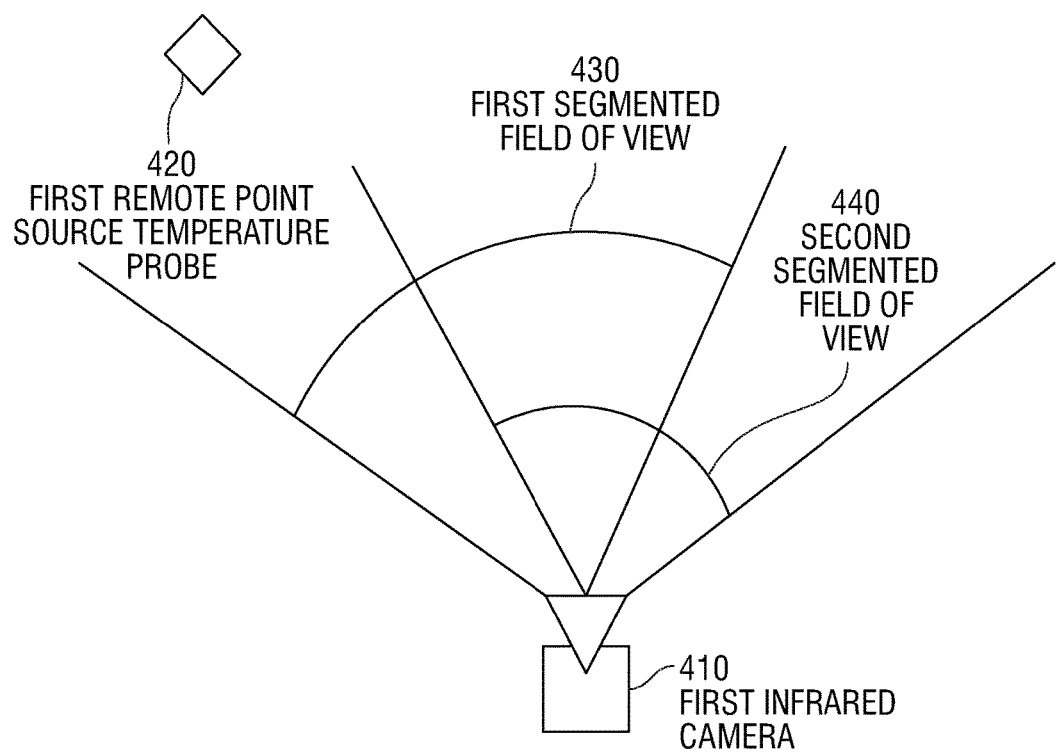
FIG. 4 is a block diagram illustrating stitching infrared images according to an embodiment of the present disclosure.

FIG. 4 is a block diagram illustrating a first infrared camera 410 in an embodiment having first and second segmented field of view. FIG. 4 shows a first remote point source temperature probe 420 located within the infrared camera's first segmented field of view 430. A second infrared camera system is described further in reference additional embodiments described below. The first infrared camera 410 in an embodiment may have a first segmented field of view 430, and a second segmented field of view 440. The first segmented field of view 430 and the second segmented field of view 440 in an embodiment, combined, may comprise the full field of view of the first infrared camera 410. The remote point source temperature probe 420 in an embodiment may be located within the first segmented field of view 430, the second segmented field of view 440, or both. Temperature measurements from the remote point source temperature probe are used to verify infrared camera temperature measurements and to calibrate the infrared camera images in the first and second segmented fields of view for emissivity relative to lighting in the room or other subject as well as angle of view. Lighting, angle of view, and other factors may alter emissivity readings by the infrared camera as is understood. A point source temperature measurement may be used as a point source calibration permitting subtraction of background radiation of light or other factors impacting emissivity. A point source in both the first and segmented fields of view may also be used as location reference for image stitching in some example embodiments.

Figure 5:
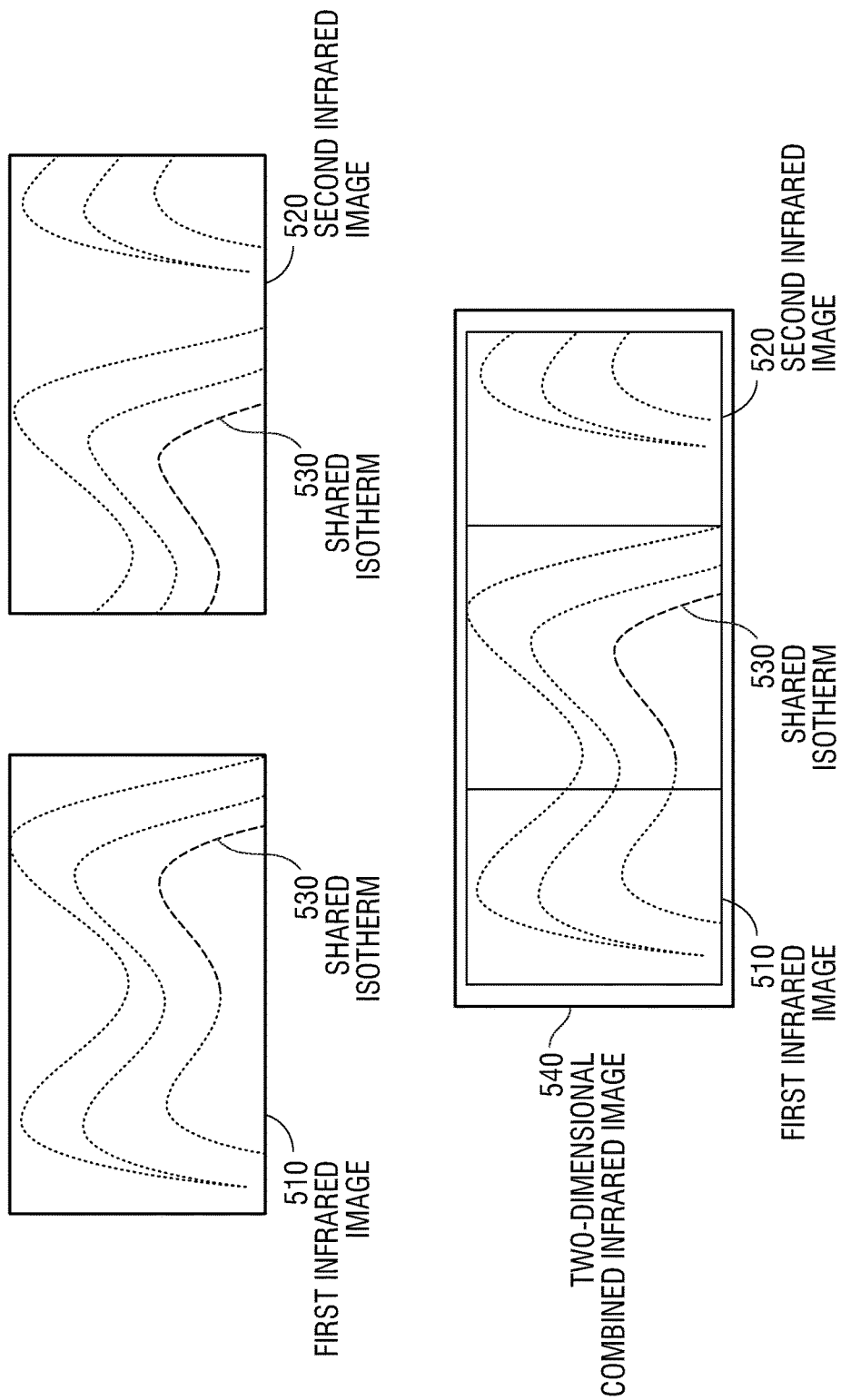
FIG. 5 is a flow diagram illustrating another method of generating combined infrared image comprising a full field of view for an infrared camera according to an embodiment of the present disclosure.

FIG. 5 is a block diagram illustrating stitching a first infrared image and a second infrared image along a first shared isotherm in an embodiment to generate a two-dimensional combined infrared image. In an embodiment, the infrared camera 410 may capture a first infrared image 510 of the first segmented field of view 430. The infrared camera 410 in an embodiment may also capture a second infrared image 520 of the second segmented field of view 440. The image-stitching module executing code instruction or operating via a specified circuit such as an ASIC may detect that a shared isotherm 530 appears within the first infrared image 510 and within the second infrared image 520. The image-stitching module may analyze pixel emissivity trends across the first and second infrared images 510 and 520. The isotherm 530 will have emissivity data levels that change across similar pixel groupings with a similar pattern. The image-stitching module in an embodiment may further generate a two-dimensional combined infrared image 540 by combining the first infrared image 510 and the second infrared image 520 such that the shared isotherm 530 as shown in the first infrared image 510 and the shared isotherm 530 as shown in the second infrared image 520 share the same coordinates in the first two-dimensional combined infrared image 540 in that the shared isotherms 530 may be aligned to align the first and second infrared image segmented fields of view. It is understood that in some embodiments a plurality of isotherms may be used for image-stitching. However, identification of additional isotherms and alignment of the first and second infrared images, including adjustment to align those infrared images may consume additional resource.

Figure 6:
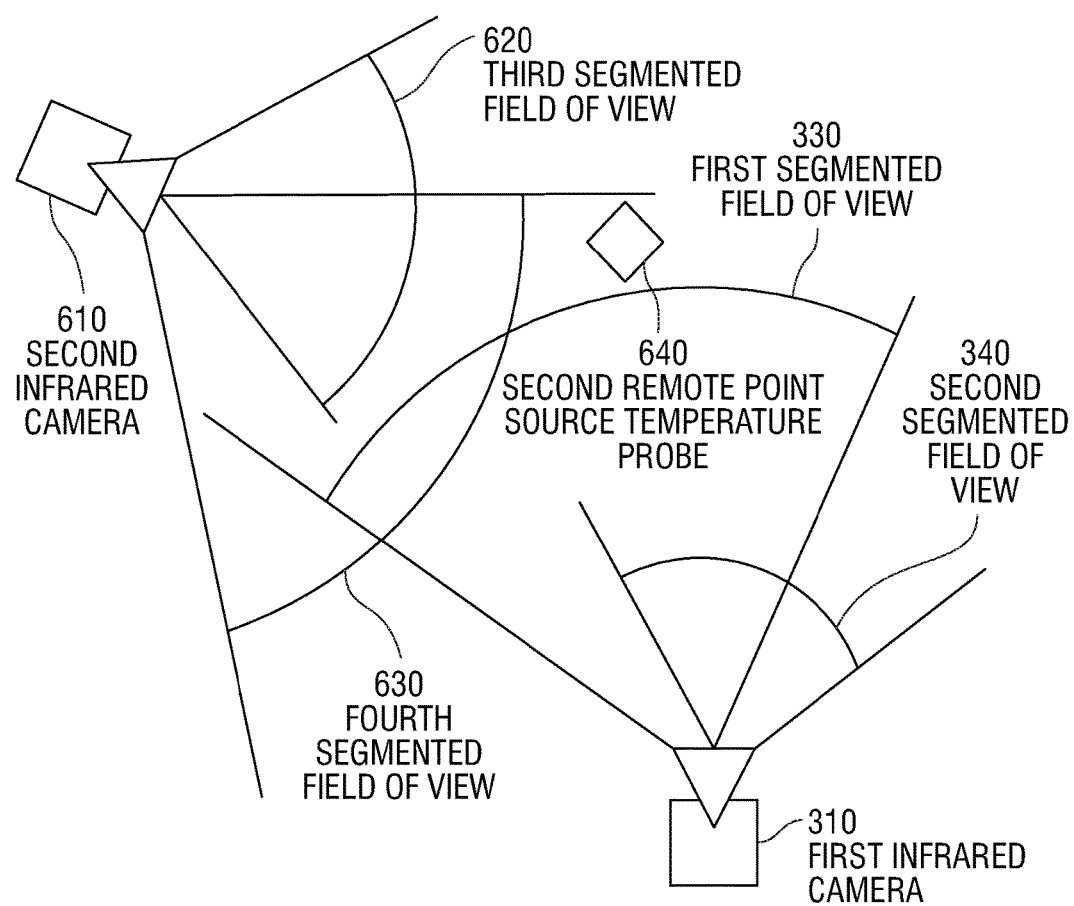
FIG. 6 is a block diagram illustrating another infrared camera having segmented fields of view and combining to comprise a full field of view according to an embodiment of the present disclosure.

FIG. 6 is a block diagram illustrating a second infrared camera 610 in an embodiment. The second infrared camera 610 in an embodiment may have a third segmented field of view 620, and a fourth segmented field of view 630. The second remote point source temperature probe 640 in an embodiment may be located within the third segmented field of view 620. The third segmented field of view 620 and the fourth segmented field of view 630 in an embodiment, combined, may comprise the full field of view of the second infrared camera 610. The third 620 and fourth 630 segmented fields of view combining to comprise the full field of view of the second infrared camera 610. The full field of view of the first infrared camera 410 overlaps, at least partially, the full field of view of the second infrared camera 610 in the example embodiment. Also shown with the first infrared camera 410 are the first segmented field of view 430 and the second segmented field of view 440. Not shown is the first remote point source temperature probe 420. It is understood that the first infrared camera 410 and the second infrared camera 610 may be arranged at any location with respect to one another and FIG. 6 represents only one example embodiment. With overlapping fields of view, images of infrared cameras 410 and 610 may be stitched together according to embodiments herein.

Figure 7:
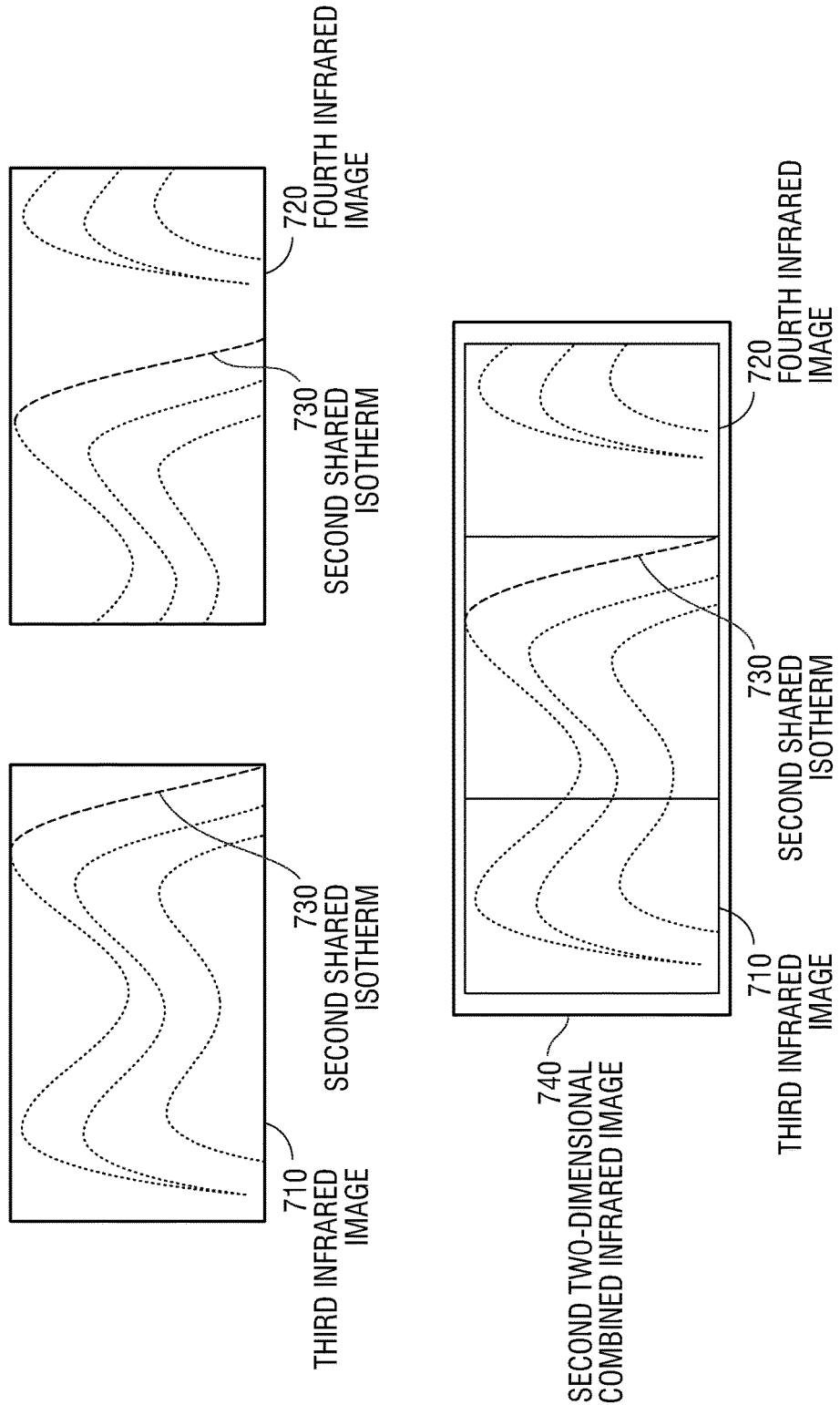
FIG. 7 is another block diagram illustrating stitching infrared images along a shared isotherm according to an embodiment of the present disclosure.

FIG. 7 is a block diagram illustrating stitching a third infrared image and a fourth infrared image along a second shared isotherm in an embodiment to generate a second two-dimensional combined infrared image. In an embodiment, the second infrared camera 610 may capture a third infrared image 710 of the third segmented field of view 620. The second infrared camera 610 in an embodiment may also capture a fourth infrared image 720 of the fourth segmented field of view 630. The image-stitching module 112 in an embodiment may detect that a second shared isotherm 730 appears within the third infrared image 710 and within the fourth infrared image 720. Changes in emissivity values recorded in a similar pattern detected along pixel areas of a similar size may be used to determine a shared isotherm. The image-stitching module 112 in an embodiment may further generate a second two-dimensional combined infrared image 740 by combining the third infrared image 710 and the fourth infrared image 720 such that the second shared isotherm 730 as shown in the third infrared image 710 and the second shared isotherm 730 as shown in the fourth infrared image 720 share the same coordinates in the second two-dimensional combined infrared image 740.

Figure 8:
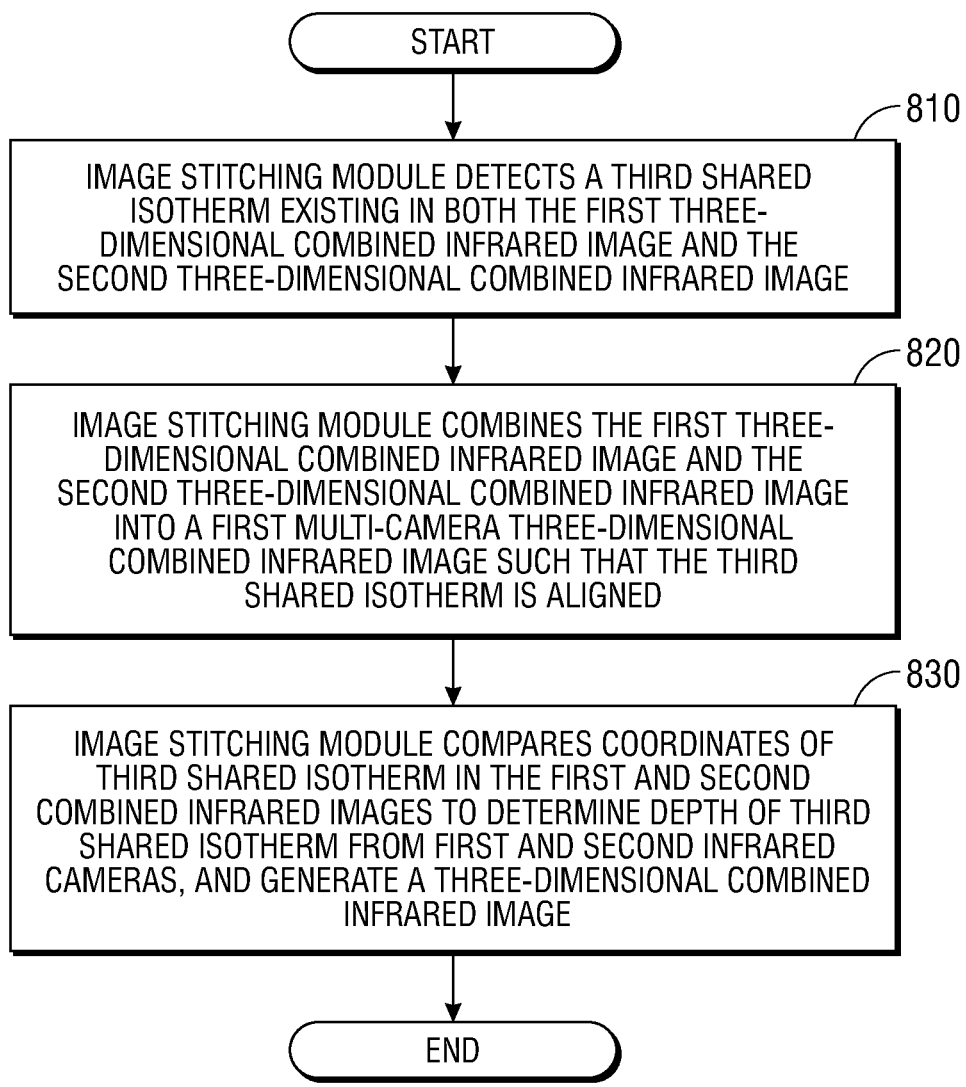
FIG. 8 is a flow diagram illustrating a method of generating combined infrared images showing the full fields of view of a plurality of infrared cameras according to an embodiment of the present disclosure.

FIG. 8 is a flow diagram illustrating a method of generating a third two-dimensional combined infrared image showing the full fields of view of both the first infrared camera and the second infrared camera, combined. FIG. 8 also discusses use of the first infrared camera and the second infrared camera to generate a third three-dimensional combined infrared image of the full fields of view of the first and second infrared cameras based on a remote point source used for distance prediction. At block 810, in an embodiment, the image-stitching module may detect a third shared isotherm existing in both the first two-dimensional combined infrared image of the first infrared camera and the second two-dimensional combined infrared image of the second infrared camera. As previously, a scan of pixels by the image stitching module operating on a processor for each combined infrared image from the first infrared camera fields of view and the second infrared camera fields of view may reveal patterns of emissivity values indicating a shared isotherm region in the combined infrared images. In the present embodiment, this is referred to as a third shared isotherm, however it is understood that in an embodiment, the first, second and/or third shared isotherms may be based off of the same shared isotherm appearing in all fields of view. In other aspects, any two shared isotherms may be the same shared isotherms.

Figure 9:
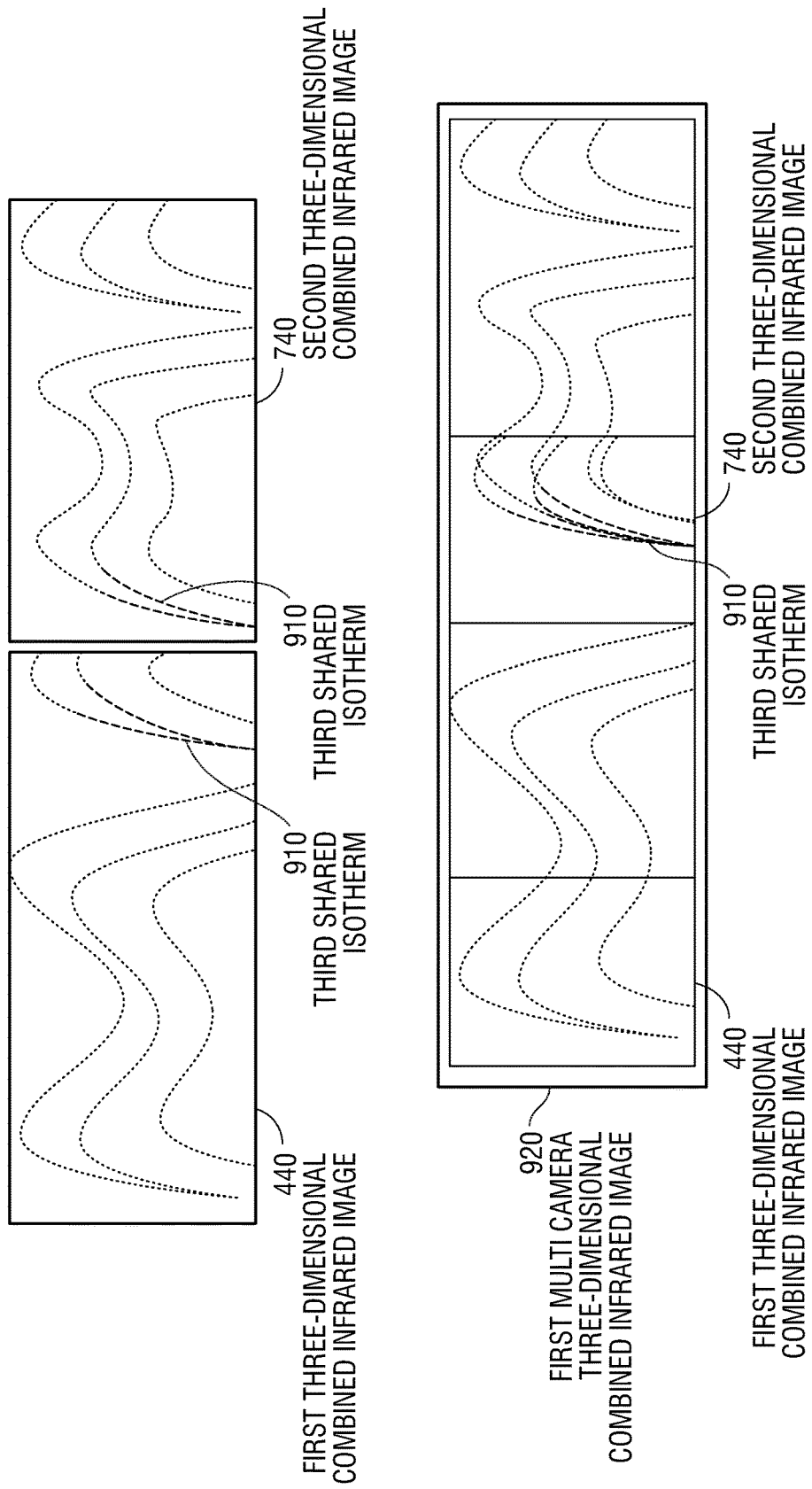
FIG. 9 is a block diagram illustrating combining a plurality of two-dimensional combined infrared images into another two-dimensional combined infrared image according to an embodiment of the present disclosure.

Proceeding to block 820, the image-stitching module may combine the first two-dimensional combined infrared image and the second two-dimensional combined infrared image into a third two-dimensional combined infrared image such that the third shared isotherm in the first two-dimensional combined infrared image and the second two-dimensional combined infrared image are aligned to have the same coordinates in the third two-dimensional combined infrared image, as described in greater detail below with reference to FIG. 9. Upon alignment of the third shared isotherm, and any other shared isotherms, alignment of the image pixels are made for overlapping pixel areas of the first and second two-dimensional combined images.

At block 830, in an embodiment, the image-stitching module may compare the coordinates of the third shared isotherm or another reference point such as a remote point source location in the first and second two-dimensional combined infrared images to determine depth coordinates of the third shared isotherm or the remote point source locations from the first and second infrared cameras. The remote point source location may be the remote point source location for a remote point source temperature probe in some example embodiments. In other embodiments, depth determination may be calculated from selection of a single remote point location. With two infrared cameras, parallax calculation of overlapping known locations within a pixel field for offset may be conducted to determine depth. In an embodiment, the image-stitching module may compare the coordinates of the remote point source location such as some portion of the third shared isotherm from the first and second two-dimensional combined infrared images to determine the depth one or more pixel locations of the third shared isotherm. With this calculation, it is understood, other depth mapping may be conducted for pixel values of the image stitched third combined infrared image to yield a third combined three-dimensional infrared image. It is further understood that a remote point source, such as a location for a remote thermal probe, may also provide a known depth location within the third combined infrared images for use as a depth reference point with which to determine and calibrate pixel shifts within the first and second combined infrared images from the first infrared camera and the second infrared camera.

In another embodiment, the image-stitching module may compare the coordinates of the first shared isotherm in the first and second infrared images from one infrared camera having multiple fields of view to determine the depth of the first shared isotherm from the first infrared camera if parallax angles and offset are known for the distinct fields of view. By comparison, the image stitching module may generate a first three-dimensional combined infrared image of the full field of view of the first infrared camera using the depth calculations based on pixel shift between two segmented fields of view with known parallax angles and the like. Similarly, for any infrared camera having a plurality of fields of view, a three dimensional calculation for pixel locations may be conducted for the combined infrared images as may be appreciated. In an embodiment, a remote points source location may be used with a known depth as a calibration point for distance determination of pixels within the infrared images from a single infrared camera. At this point the process of FIG. 8 may end.

FIG. 9 is a block diagram illustrating combining, in an embodiment, a first two-dimensional combined infrared image and a second two-dimensional combined infrared image into a third two-dimensional combined infrared image such that the third shared isotherm in the first two-dimensional combined infrared image and the second two-dimensional combined infrared image has the same coordinates in the third two-dimensional combined infrared image. The image-stitching module 112 in an embodiment may detect a third shared isotherm in the first two-dimensional combined infrared image 540 and in the second two-dimensional combined infrared image 740. The image-stitching module 112 in an embodiment may also combine the first two-dimensional combined infrared image 540 and the second two-dimensional combined infrared image 740 into a third two-dimensional combined infrared image 920 such that the third shared isotherm 910 as shown in the first two-dimensional combined infrared image 540 and as shown in the second two-dimensional combined infrared image 740 has the same coordinates in the third two-dimensional combined infrared image 920.

Figure 10:
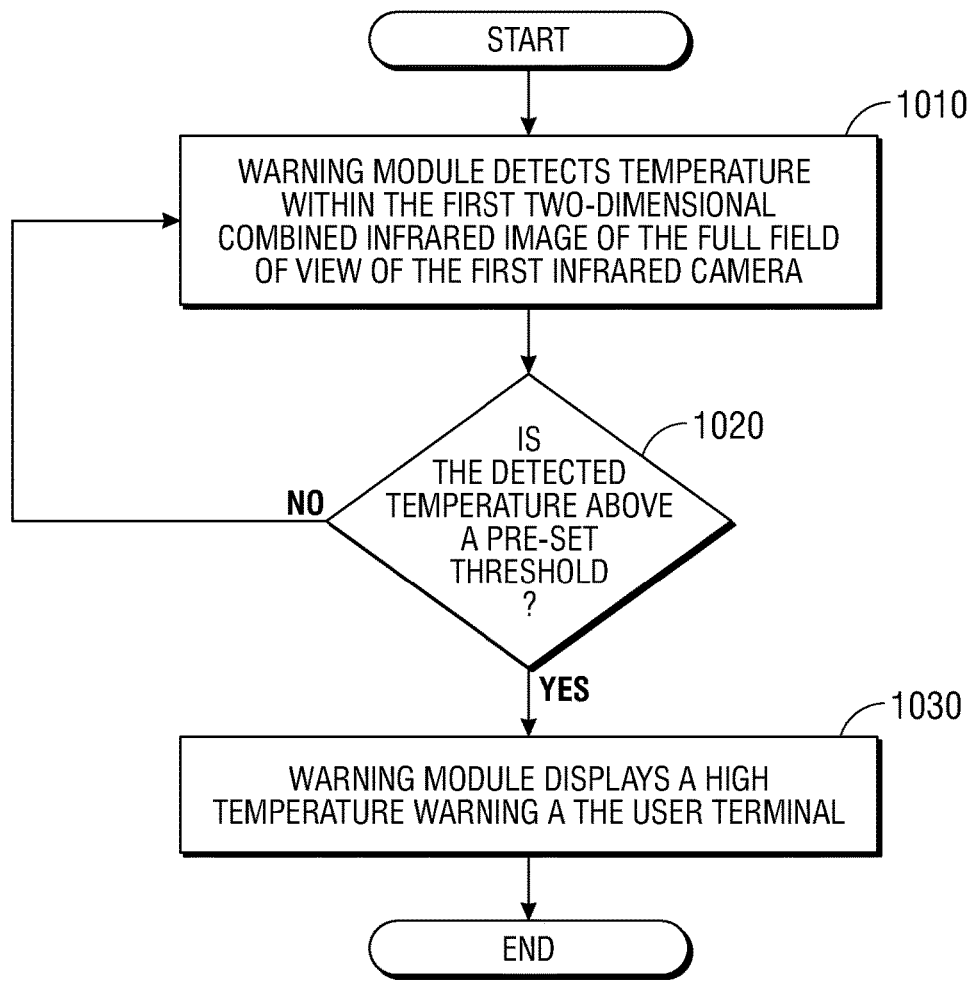
FIG. 10 is a flow diagram illustrating a method for displaying a high-temperature warning at a user terminal according to an embodiment of the present disclosure.

FIG. 10 is a flow diagram illustrating a method in an embodiment for displaying a high-temperature warning at a user terminal when a detected temperature in the first two-dimensional combined infrared image is above a pre-set threshold. A temperature warning module as described above may be utilized at a IoT surface temperature measurement gateway device to determine hot spots that exceed the temperature threshold in detected infrared images. A user terminal may be a remotely located from the IoT gateway or may be local to the IoT gateway device in some embodiments.

At block 1010, in an embodiment, the temperature warning module may detect a temperature within the first two-dimensional combined infrared image of the full field of view of the first infrared camera. At block 1020, in an embodiment, if the temperature detected by the temperature warning module is below a pre-set threshold for all pixel locations within the first two-dimensional combined infrared image, the warning module returns to 1010 and repeats the actions described as a continuous monitoring of the surface temperature observation area. In some embodiments, the monitoring may be periodic to provide savings of IoT gateway processing and energy consumption. In other words, sets of infrared images from the infrared camera or cameras may be taken in a relative periodic fashion and processed upon receipt by the infrared image stitching module and temperature warning module. In other embodiments, the process may end and a next infrared image set taken of a surface temperature observation area may be commanded manually.

If a pixel or pixel area is detected in the first combined two-dimensional infrared image is detected at a temperature above a pre-set threshold at block 1020, the temperature warning module may proceed to block 1030. At block 1030, in an embodiment, the warning module may display a high-temperature warning indicator at a user terminal to indicate one or more hot spots within a surface temperature observation area. This high-temperature warning indicator may indicate to the user the approximate temperature values and location of the detected temperature hot spot that is at or above the pre-set threshold. The user may set the pre-set threshold to any value within the temperature range of the first infrared camera or the second infrared camera. For example, the user may place the first infrared camera such that a device whose operating temperature cannot reach or exceed a set temperature, say 100 degrees Fahrenheit, is located within the field of view of the first infrared camera. The user may also indicate a pre-set temperature threshold of 100 degrees Fahrenheit. According to the method shown in FIG. 10, if the temperature warning module detects a temperature at or above 100 degrees Fahrenheit in the first two-dimensional combined infrared image of the full field of view of the first infrared camera (which includes the device), the temperature warning module would display a high-temperature warning indicator at the user terminal may display the temperature value and location of the detected temperature above 100 degrees Fahrenheit. The warning indicator may further include metadata such as time of the detected threshold temperature level in some embodiments. In additional embodiments, a location of the detected temperature threshold may be provided based on which of a plurality of infrared cameras captured the infrared image containing the detected hot spot. The high-temperature warning indicator may include an infrared image showing temperature values at locations in an embodiment. In other embodiments, the temperature warning indicator may include an overlay of visual images of the surface temperature observation area showing location of hot spots detected. In yet other embodiments, a visual image of the surface temperature observation area may be viewed from the infrared images themselves.

It is understood that a third combined two dimensional infrared image may also be used with the temperature warning module to detect hot spots that exceed a pre-set threshold temperature. It is further understood that a combined three dimensional infrared image generated for depth association with temperature measurements may be similarly used by the temperature warning module to determine and indicate hot spots in an aspect of the present disclosure. In yet another embodiment, a depth measurement may be provided for the infrared temperature measurements of the surface temperature observation area to provide additional detail on location of hot spots detected by the temperature warning module.

In the above-recited methods of the figures, it is understood that not all steps recited may be performed, additional steps not recited may be performed, and the steps recited may be performed in any order and no specific order is recited or intended. It may be further appreciated that method embodiments and algorithms discussed may be combined in various parts and in any order by those of skill in the art.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
  a storage device;
  the storage device for receiving a first infrared image and a second infrared image of a temperature observation area captured from a first infrared camera, each infrared image having a segmented field of view, wherein a segmented field of view of the first infrared image is spatially contiguous and partially overlaps a segmented field of view of the second infrared image;
  a network adapter to receive temperature recording data from a first remote point source temperature probe located within at least one of the segmented fields of view;
  a processor operatively coupled to the memory and network adapter and executing code instructions of an image-stitching module for calibrating the first infrared image based on temperature values from the temperature recording data received from the first remote point source temperature probe; and
  the processor executing code instructions of the image-stitching module to stitch the first infrared image together with the second infrared image to create a first combined infrared image by detecting one or more shared isotherms in each of the first infrared image and the second infrared image.

2. The information handling system of claim 1, wherein the first combined infrared image is created by aligning the shared isotherm in the first infrared image and the second infrared image at the same coordinates in the first combined infrared image.

3. The information handling system of claim 1, wherein each of the combined segmented fields of view from a plurality of infrared images, including the captured first infrared image and the second infrared image, comprise the full field of view of the first infrared camera.

4. The information handling system of claim 1, wherein the first remote point source temperature probe is located within at least one of the segmented fields of view at a known location relative to the first infrared camera and records temperature at the known location.

5. The information handling system of claim 1, wherein the first remote point source temperature probe is located at a known depth relative to the first infrared camera and may be used to determine depth associated with pixels in the first or second infrared image.

6. The information handling system of claim 1, wherein the image-stitching module compares the pixel coordinates of the first shared isotherm in first and second infrared images to determine depth of the first shared isotherm from the first infrared camera, and generates a three-dimensional combined infrared image.

7. The information handling system of claim 1, wherein the first point source temperature probe communicates with the processor via a wireless connection.

8. The information handling system of claim 1, further comprising:

the processor executing code instructions of a temperature warning module, wherein in response to detecting temperatures above a preset threshold within the first combined infrared image the temperature warning module generates a temperature warning indicator.

9. A computerized method for generating an infrared temperature map comprising:
   receiving at a storage device a first infrared image and a second infrared image of a temperature observation area captured from a first infrared camera, each infrared image having a segmented field of view, wherein a segmented field of view of the first infrared image is spatially contiguous and partially overlaps a segmented field of view of the second infrared image;
   receiving temperature recording data via a network adapter from a first remote point source temperature probe located within at least one of the segmented fields of view;
   executing code instructions of an image-stitching module via a processor for calibrating the first infrared image based on temperature values from the temperature recording data received from the first remote point source temperature probe; and
   executing code instructions of the image-stitching module via the processor to stitch the first infrared image together with the second infrared image to create a first combined infrared image by detecting one or more shared isotherms in each of the first infrared image and the second infrared image and aligning the shared isotherms at the same coordinates in the first combined infrared image.

10. The computerized method for generating a temperature map of claim 9 wherein the first infrared camera communicates with the processor via an I/O data bus.

11. The computerized method for generating a temperature map of claim 9 wherein the first infrared camera communicates with the processor via a wireless connection.

12. The computerized method for generating a temperature map of claim 9 wherein the first remote point source temperature probe is located within at least one of the segmented fields of view at a known location relative to the first infrared camera and records temperature at the known location.

13. The computerized method for generating a temperature map of claim 9, further comprising:
   receiving at a storage device a third infrared image and a fourth infrared image of the temperature observation area captured from a second infrared camera, each infrared image having a segmented field of view, wherein a segmented field of view of the third infrared image overlaps at least in part a segmented field of view of the fourth infrared image
   receiving temperature recording data via the network adapter from a second remote point source temperature probe located within at least one of the segmented fields of view of the third infrared image or the fourth infrared image;
   executing code instructions of the image-stitching module via the processor for calibrating the third infrared image based on temperature values from the temperature recording data received from the second remote point source temperature probe; and
   executing code instructions of the image-stitching module via the processor to stitch the third infrared image together with the fourth infrared image to create a second combined infrared image by detecting one or more shared isotherms in each of the third infrared image and the fourth infrared image and aligning the shared isotherms at the same coordinates in the second combined infrared image.

14. The computerized method for generating a temperature map of claim 13 wherein the first remote point source temperature probe is the same as the second remote point source temperature probe.

15. An information handling system comprising:
   a storage device;
   the storage device for receiving a first infrared image and a second infrared image of a temperature observation area captured from a first infrared camera and a third infrared image and a fourth infrared image from a second infrared camera, each infrared image having a segmented field of view, wherein a segmented field of view of the first infrared image is spatially contiguous and partially overlaps a segmented field of view of the second infrared image and a segmented field of view of the third infrared image is spatially contiguous and partially overlaps a segmented field of view of the fourth infrared image;
   a network adapter to receive temperature recording data from a first remote point source temperature probe located within at least one of the segmented fields of view;
   a processor operatively coupled to the memory and network adapter and executing code instructions of an image-stitching module for calibrating at least the first infrared image based on temperature values from the temperature recording data received from the first remote point source temperature probe; and
   the processor executing code instructions of the image-stitching module to stitch the first infrared image together with the second infrared image to create a first combined infrared image along a first shared isotherms detected in each of the first infrared image and the second infrared image; and
   the processor executing code instructions of the image-stitching module to stitch the third infrared image together with the fourth infrared image to create a second combined infrared image along a second shared isotherms detected in each of the third infrared image and the fourth infrared image.

16. The information handling system of claim 15, further comprising:
   the processor executing code instructions of the image-stitching module to stitch the first combined infrared image together with the second combined infrared image along a third shared isotherms detected in each of the first combined infrared image and the second combined infrared image to create a third combined infrared image for a full field of view of the first and second infrared cameras.

17. The information handling system of claim 16, wherein the image-stitching module compares the pixel coordinates of the third shared isotherm in first combined infrared image from the first infrared camera and second combined infrared images from the second infrared camera to determine depth of the infrared pixels at the third shared isotherm to generate a three-dimensional third combined infrared image.

18. The information handling system of claim 15, wherein the first point source temperature probe communicates with the processor via a wireless connection.

19. The information handling system of claim 15, further comprising:

the storage device for receiving a plurality of infrared images of the temperature observation area captured from a plurality of additional infrared cameras;

the processor executing code instructions of the image-stitching module to stitch the plurality of infrared images together from each additional infrared camera along additional detected shared isotherms to generate a plurality of additional combined infrared images of the temperature observation area; and the processor executing code instructions of the image-stitching module to stitch the plurality of additional combined infrared images along one or more additional shared isotherms to generate a full field view of temperature observation area.

20. The information handling system of claim 16, further comprising:

the processor executing code instructions of a temperature warning module, wherein in response to detecting temperatures above a preset threshold within the third combined infrared image the temperature warning module generates a temperature warning indicator including an indication of the location of a detected temperature hotspot.

* * * * *